United States Patent
Chakravarty et al.

(10) Patent No.: US 7,831,793 B2
(45) Date of Patent: Nov. 9, 2010

(54) DATA STORAGE SYSTEM INCLUDING UNIQUE BLOCK POOL MANAGER AND APPLICATIONS IN TIERED STORAGE

(75) Inventors: Tridib Chakravarty, Irvine, CA (US); Jan Jitze Krol, San Diego, CA (US); John Maroney, Irvine, CA (US)

(73) Assignee: Quantum Corporation, San Jose, CA (US)

( * ) Notice: Subject to any disclaimer, the term of this patent is extended or adjusted under 35 U.S.C. 154(b) by 862 days.

(21) Appl. No.: 11/710,876

(22) Filed: Feb. 26, 2007

(65) Prior Publication Data
US 2007/0208788 A1 Sep. 6, 2007

Related U.S. Application Data

(60) Provisional application No. 60/778,639, filed on Mar. 1, 2006.

(51) Int. Cl.
*G06F 17/30* (2006.01)
(52) U.S. Cl. ............... 711/165; 711/111; 711/E12.002; 707/651
(58) Field of Classification Search ........................ None
See application file for complete search history.

(56) References Cited

U.S. PATENT DOCUMENTS

| | | |
|---|---|---|
| 4,541,019 A | 9/1985 | Precourt |
| 5,649,196 A | 7/1997 | Woodhill et al. |

(Continued)

FOREIGN PATENT DOCUMENTS

EP 07250864.1 7/2007

(Continued)

*Primary Examiner*—Matt Kim
*Assistant Examiner*—Kaushikkumar Patel
(74) *Attorney, Agent, or Firm*—Roeder & Broder LLP; James P. Broder

(57) ABSTRACT

A data storage system (10) that receives a data set from a software module (18A-D) includes a first tier storage device (240), a second tier storage device (242), a redundancy reducer (21) and a migration engine (28). The first tier storage device (240) has a first effective storage capacity and the second tier storage device (242) can have a second effective storage capacity that is greater than the first effective storage capacity. The redundancy reducer (21) subdivides the data set into a plurality of data blocks (20) and reduces the redundancy of the data blocks (20). The migration engine (28) moves one or more of the data blocks (20) between the first tier storage device (240) and the second tier storage device (242) based on a migration parameter of the data block (20). The first tier storage device (240) can store data in a random access manner and the second tier storage device (242) can store data in a random or sequential access manner. The first tier storage device (240) has a first I/O bandwidth, and the second tier storage device (242) can have a second I/O bandwidth that is less than the first I/O bandwidth. The first tier storage device (240) has a first access time to data, and the second tier storage device (242) can have a second access time to data that is lengthier than the first access time to data. The data storage system (10) can also include a third tier storage device (238) used for retired data blocks (20).

55 Claims, 7 Drawing Sheets

U.S. PATENT DOCUMENTS

| | | | |
|---|---|---|---|
| 5,802,398 | A | 9/1998 | Liu et al. |
| 5,930,141 | A | 7/1999 | Kamiyama et al. |
| 5,956,688 | A | 9/1999 | Kokubo et al. |
| 5,983,295 | A | 11/1999 | Cotugno |
| 5,990,810 | A | 11/1999 | Williams |
| 6,032,176 | A | 2/2000 | Nishimura |
| 6,154,427 | A | 11/2000 | Yokota et al. |
| 6,233,592 | B1 | 5/2001 | Schnelle et al. |
| 6,269,464 | B1 | 7/2001 | Boussina et al. |
| 6,348,974 | B1 | 2/2002 | Takahashi et al. |
| 6,636,908 | B1 | 10/2003 | Winokur et al. |
| 6,704,838 | B2 | 3/2004 | Anderson |
| 6,718,410 | B2 | 4/2004 | Slater |
| 6,948,042 | B2 | 9/2005 | Nagase et al. |
| 6,959,368 | B1 | 10/2005 | St. Pierre et al. |
| 6,961,812 | B2 | 11/2005 | Bjork et al. |
| 7,165,059 | B1 * | 1/2007 | Shah et al. ................ 707/1 |
| 7,293,133 | B1 * | 11/2007 | Colgrove et al. ............ 711/111 |
| 2002/0107877 | A1 * | 8/2002 | Whiting et al. ............. 707/204 |
| 2004/0225697 | A1 | 11/2004 | Asano et al. |
| 2005/0038954 | A1 | 2/2005 | Saliba |
| 2005/0097126 | A1 * | 5/2005 | Cabrera et al. ............. 707/102 |
| 2006/0282457 | A1 | 12/2006 | Williams |
| 2007/0050423 | A1 * | 3/2007 | Whalen et al. ............. 707/200 |
| 2007/0083575 | A1 * | 4/2007 | Leung et al. ................ 707/205 |

FOREIGN PATENT DOCUMENTS

| | | | |
|---|---|---|---|
| WO | WO-03/046721 | A1 | 6/2003 |

* cited by examiner

DATA STORAGE SYSTEM INCLUDING UNIQUE BLOCK POOL MANAGER AND APPLICATIONS IN TIERED STORAGE

RELATED APPLICATION

This Application claims the benefit on U.S. Provisional Application Ser. No. 60/778,639 filed on Mar. 1, 2006. The contents of U.S. Provisional Application Ser. No. 60/778,639 are incorporated herein by reference.

BACKGROUND

Conventional data backup systems can be relatively inefficient in the manner in which data is copied. Using such systems can in many cases result in a large amount of duplicate data, or blocks of data, being copied. It is typical for computers to back up many versions of the same document, with only slight variations between the versions. For example, if data from a computer system is routinely copied on a weekly basis to backup media, from week to week only a relatively small amount of data may be new. Unfortunately, in conventional backup systems, both the unchanged data and the new data are copied, which results in a significant amount of unnecessary, redundant data on the backup media.

To illustrate, after one week, all of the data that is backed up is considered unique. If 10% of the data changes from week to week, then after week two, only 55% of the total data will be unique. After week three, only 40% of the total data that is backed up is unique, and so on. After one year, less than 12% of the total data that is backed up is unique. As a result, greater storage capacity is required resulting in increased storage costs. Further, this redundancy of data being stored can cause an increase in data retrieval time from backup, decreasing the overall efficiency of the system.

SUMMARY

The present invention is directed toward a data storage system that receives a data set from a software module. In one embodiment, the data storage system includes a first tier storage device, a second tier storage device, a redundancy reducer and a migration engine. In certain embodiments, the first tier storage device has a first effective storage capacity. The second tier storage device has a second effective storage capacity that is greater than the first effective storage capacity. The redundancy reducer subdivides the data set into a plurality of data blocks and reduces the redundancy of the data blocks. The migration engine moves one or more of the data blocks between the first tier storage device and the second tier storage device based on a migration parameter of the data block.

In one embodiment, the redundancy reducer includes a hash engine and/or a lookup engine. In further embodiments, the migration parameter can include one or more of a reference count, a last access time, an access rate, and/or a user-defined access policy.

In certain embodiments, the storage system also includes a metadata index that is stored one of the storage devices. In these embodiments, the migration engine can update the metadata index in conjunction with movement of one of the data blocks by the migration engine. In some embodiments, the first tier storage device includes a disk drive that stores at least a portion of the data set prior to reduction of the redundancy of the data blocks by the redundancy reducer. Further, the second tier storage device can include a disk drive that stores at least a portion of the data set following reduction of the redundancy of the data blocks by the redundancy reducer. In another embodiment, the storage system includes a third tier storage device having a third effective storage capacity that is greater than the second effective storage capacity. In this embodiment, the migration engine moves one of the data blocks between the second tier storage device and the third tier storage device based on a migration parameter of the data block. The third tier storage device can include a tape library, a MAID or another type of archival storage device, fixed or removable.

In some embodiments, the software module is selected from the group consisting of virtual tape, network attached storage, content addressable storage and a cluster file system. In one embodiment, the first tier storage device stores data in a random access manner, and the second tier storage device stores data in a random access or sequential access manner. In certain embodiments, the first tier storage device has a first I/O bandwidth, and the second tier storage device has a second I/O bandwidth that is less than the first I/O bandwidth. In some embodiments, the first tier storage device has a first access time to data, and the second tier storage device has a second access time to data that is lengthier than the first access time to data.

BRIEF DESCRIPTION OF THE DRAWINGS

The invention, together with further advantages thereof, may best be understood by reference to the following description taken in conjunction with the accompanying drawings, taken in conjunction with the accompanying description, in which similar reference characters refer to similar parts, and in which.

DESCRIPTION

Specific embodiments of the invention will now be described in some further detail with reference to and as illustrated in the accompanying figures. These embodiments are illustrative, and are not meant to be restrictive of the scope of the invention. Suggestions and descriptions of other embodiments may be included within the scope of the invention but they may not be illustrated in the accompanying figures or alternatively features of the invention may be shown in the figures but not described in the specification.

Figure 1:
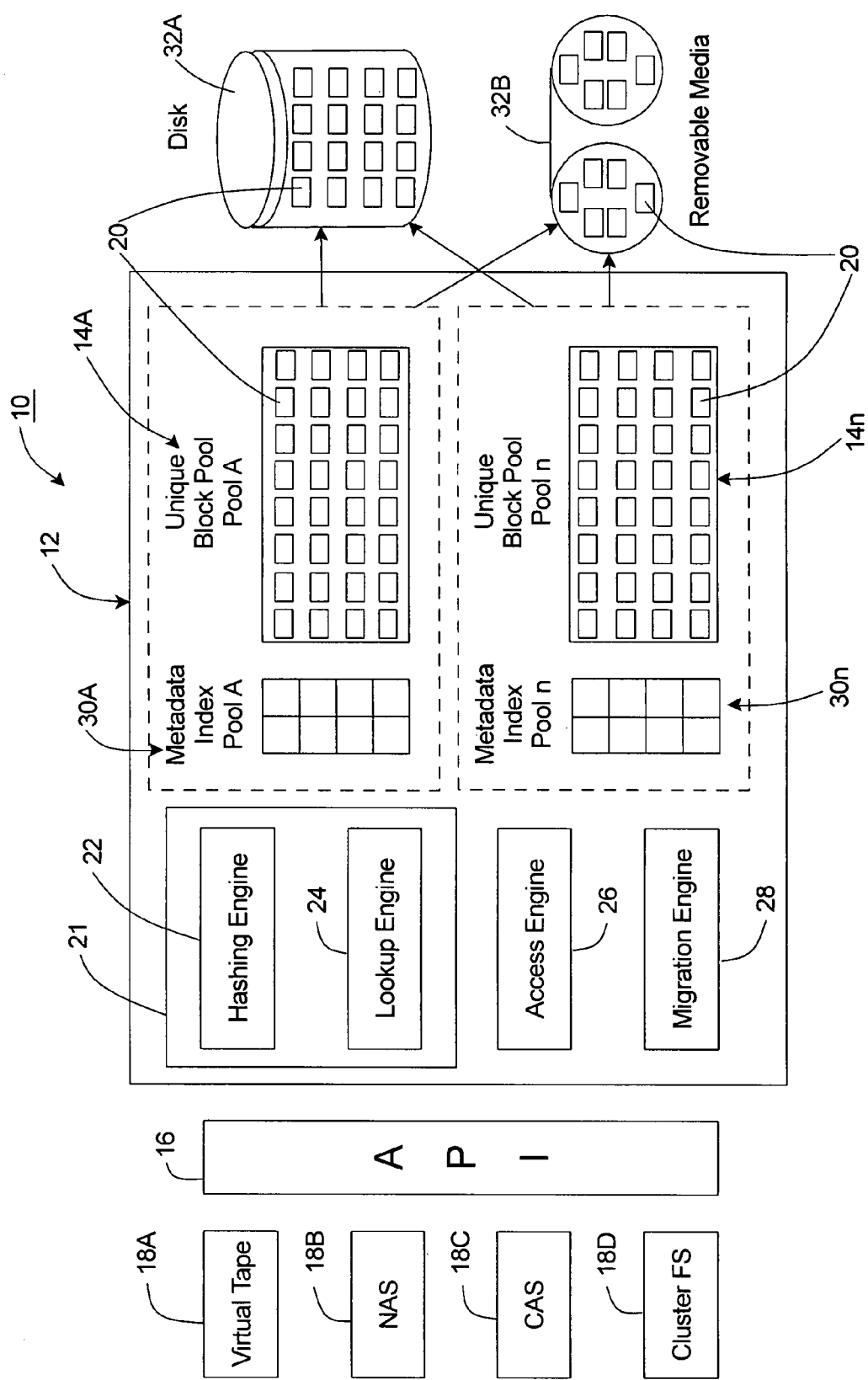
FIG. 1 is a simplified block diagram of one embodiment of a data storage system having features of the present invention.

FIG. 1 is a block diagram of one embodiment of a data storage system 10 (also sometimes referred to herein as "storage system") in accordance with the present invention. In this embodiment, the storage system 10 includes a unique block pool manager 12 (also sometimes simply referred to herein as "manager") that manages one or more block pools 14A-14n. In one embodiment, the manager 12 exports an Application Programming Interface 16 (API) through which one or more software modules 18A-D, i.e. Virtual Tape 18A, Network Attached Storage 18B (NAS), Content Addressable Storage 18C (CAS), Cluster File Systems 18D (Cluster FS), etc., can utilize the manager 12. Other suitable software modules can include any type of computer system, networks of computer systems, processes in computer systems, distributed or non-distributed file systems, components of software, and/or communications systems. It is recognized that the foregoing software modules are provided as representative, non-exclusive examples only, and are not intended to limit the types of software modules or other computing systems that can be utilized with the manager 12.

The API 16 allows users of the storage system 10 to store and retrieve a plurality of data blocks 20 using a ticket that is returned by the API 16 on a store and is presented to the API 16 to retrieve a data block 20. The API 16 can also facilitate the creation, merging, movement, migration, statistical analysis, etc., of one or more of the block pools 14A-14n themselves.

The design of the manager 12 can vary to suit the design requirements of the storage system 10. In one embodiment, the manager 12 can include one or more of (i) a redundancy reducer 21 having a hash engine 22 and/or a lookup engine 24, (ii) an access engine 26, and (iii) a migration engine 28. The redundancy reducer 21 reduces the redundancy of a given data set. The specific method employed by the redundancy reducer 21 can vary depending upon the design requirements of the storage system 10. Various methods of reducing the redundancy of a data set, including various embodiments of the hash engine 22, are disclosed in U.S. Pat. No. 5,990,810, issued to Ross Neil Williams on Nov. 23, 1999, and in United States Patent Application Publication US 2006/0282457 A1, filed by Ross Neil Williams, and published on Dec. 14, 2006. To the extent permitted, the disclosures of U.S. Pat. No. 5,990,810 and United States Patent Application Publication US 2006/0282457 A1 are incorporated herein by reference.

The redundancy reducer 21 utilizes the hash engine 22 and the lookup engine 24 to store only unique data blocks 20 in the unique data block pools 14A-14n. By storing only the unique data blocks 20, a substantial savings of storage space can be realized. For example, assuming a backup of data occurs on a given system on a weekly basis, and assuming only 5% of the data saved week over week is new data, ultimately nearly a 20-fold reduction in storage can be achieved. Stated another way, the initial set of data is stored, and only the new, unique data is stored thereafter. Over time, the stored unique data approaches 1/20 of the total raw data that would otherwise have been stored, which would include redundancies. It is recognized that the extent of the reduction in storage space can vary from the preceding example based on the percentage of unique data blocks 20 that are included in the data set from one backup session to the next.

The hash engine 22 can be implemented in software or on an application specific integrated circuit (ASIC) in hardware, as non-exclusive examples. The hash engine 22 includes a hash algorithm that is a reproducible method of associating a different digital fingerprint with each unique data block 20. The hash engine 22 is responsible for generating a hash on a data set that is fed into the storage system 10 from one of the software modules 18A-D via the API 16. Hash engines 22 are generally known in the art.

The type of hash engine 22 that can be incorporated into the manager 12 can vary depending upon the design requirements of the storage system 10. As used herein, the term "hash" can be a fixed length sequence of bytes or bits that is generated by the hash engine 22. Generally, the hash engine 22 accepts one or more data blocks 20 that each includes a finite input sequence of bytes or bits of data and generates the hash that includes a finite sequence of bytes or bits that is highly dependent upon the input sequence of each data block 20. Each fixed length hash corresponds to a data block 20 which may have varying lengths relative to one another. The hash engine 22 can be used to test whether two data blocks 20 may be identical of different without having to compare the data blocks 20 directly. In one embodiment, the hash is computed over the entire data set which is input into the manager 12. The entire data set is organized within the manager 12 into one or more block pools 14A-14n. The hash can also be returned to the user of the API 16 as a handle for retrieval of a portion or all of the data set. In one embodiment, once the hash is computed, it is passed on along with the entire data set to the lookup engine 24.

The lookup engine 24 maintains one or more metadata indices 30A-30n of the data blocks 20. As used herein, "metadata" is information about a data block 20. A block's metadata can include (without limitation) a length of the data block 20, a hash of the data block 20, an expiry date of the data block 20, a reference count of the data block 20, and/or any other relevant identifier information about the data block 20. The expiry date defines the earliest date when the data block 20 is guaranteed not to be required by a user of the storage system 10, as described in greater detail below. Further, the reference count is associated with the current number of references to the data block 20 over a predetermined period of time. The system 10 utilizes the reference count to determine when the data block 20 is no longer required and/or when the data block 20 should be migrated to another location, as set forth in greater detail below.

In one embodiment, on a write request by a user of the storage system 10, the lookup engine 24 can look up the hash value generated by the hash engine 22 against one or more of the metadata indices, e.g., metadata index 30A, for a given block pool, e.g., block pool 14A. If the hash already exists, the lookup engine 24 can determine that the data block 20 already exists in the block pool 14A and can increase the reference count for that data block 20. If the hash does not exist, an entry can be made in the metadata index 30A and the data block 20 can be submitted to the access engine 26 for storage.

On a read request by a user of the storage system 10, the lookup engine 24 can determine if the hash exists in the metadata index 30A. If it does, the read request can be submitted to the access engine 26 for retrieval. Upon retrieval, the lookup engine 24 can mark the last access time for the data block 20 before returning the data block 20 to the user.

In certain embodiments, the access engine 26 is responsible for storage and retrieval of the unique data blocks 20 from one or more of the block pools, e.g., block pool 14A. In one embodiment, the access engine 26 is given the current location by the lookup engine 24. The access engine 26 can then retrieve or store the data blocks 20 to one or more different storage media 32A-B which can include fixed or removable disk 32A, tape 32B, or optical disk (not illustrated in FIG. 1), as non-exclusive examples.

The migration engine 28 is responsible for migrating data blocks 20 based on one or more migration parameters that can include reference count, last access time, number of accesses, etc. As described in greater detail below, in one embodiment, the migration engine 28 moves data blocks 20 between different storage devices (also referred to herein as "tiers", as described in greater detail below) such as disk 32A and/or removable media 32B and updates the location(s) of the data blocks 20 in the relevant metadata indices 30A-30n once the data blocks 20 are moved.

The following examples of applications and/or operations explain some of the functions of the manager 12 and the storage system 10 as a whole. These non-exclusive examples are provided for purposes of illustration only, and are not intended to limit the scope of the present invention in any manner.

Store Dataset: This operation is the basic store operation. In one embodiment, upon receiving a data set, the hash engine 22 computes an overall data set hash which is used as a handle for the data set. The data set is split into blocks that are checked for uniqueness against one or more of the block pools 14A-14n. At the end, the entire data set can be replaced with pointers to unique data blocks 20, forming a pointer map. When a new unique data block 20 is linked in, the relevant migration parameters for that data block 20 are tracked, such as a reference count, a last access time, the number of accesses per unit time, or any other suitable user-defined access policy. The user-defined access policy can include any policy that suits the needs of the user, such as the user determining a specified time period that the data block or data set should be located in a particular storage device or tier before the data block or data set is migrated or deleted, as one non-exclusive example. Any other suitable user-defined access policies can be included as a migration parameter.

Retrieve Dataset: In this operation, the user can input a hash handle. The hash handle is used to retrieve the pointer map. The pointer map is then used to recreate the data set by assembling the data blocks 20 and then returning the data set to the user. When a data block 20 is retrieved, the relevant migration parameters, such as reference count, last time accessed, etc., are updated.

Figure 2:
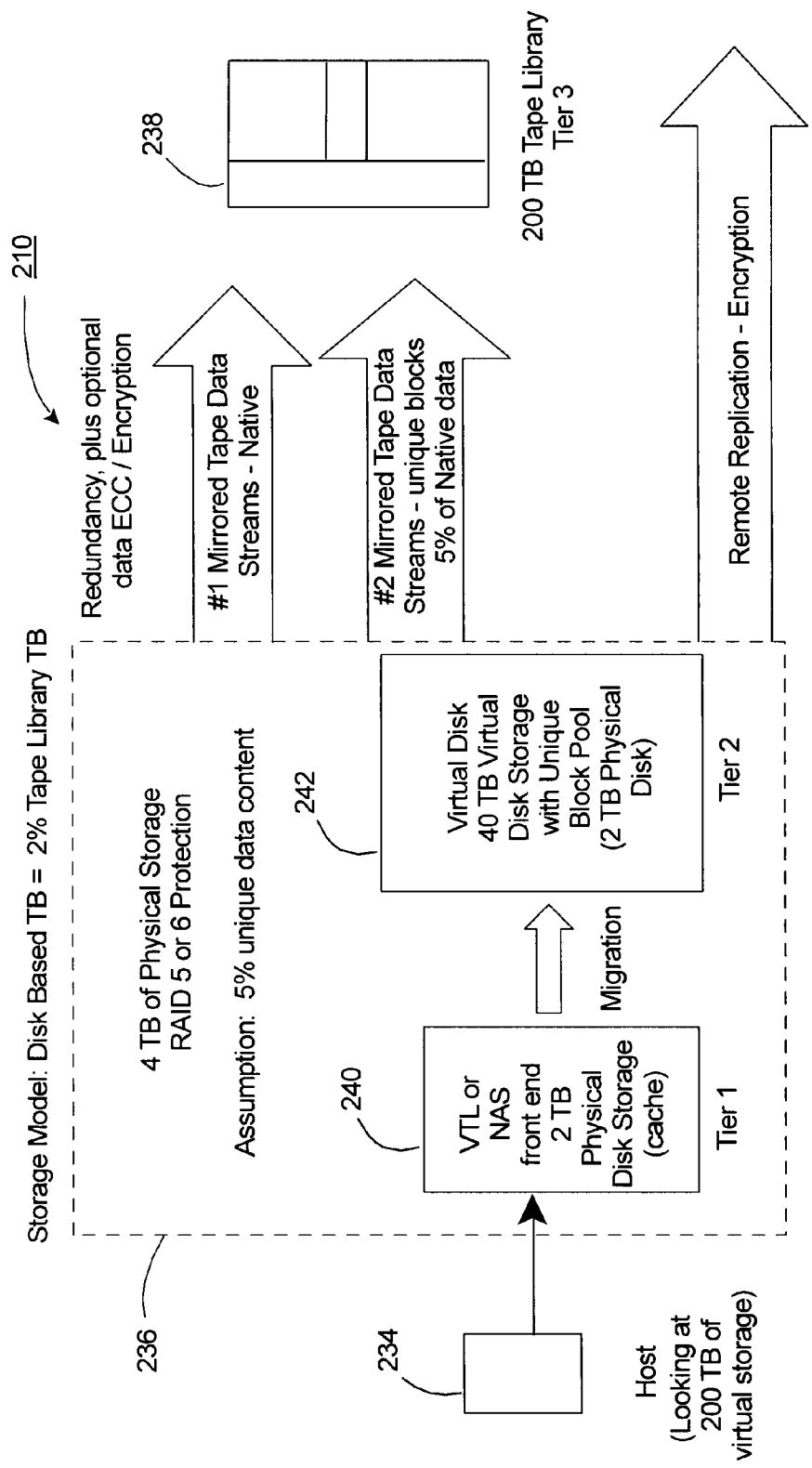
FIG. 2 is a simplified block diagram of another embodiment of the data storage system.

Migrate/Unmigrate Block: Data blocks 20 in the block pool 14A-14n can contain the reference count, the last time accessed and/or an access rate (number of accesses per unit time), for example. Any or all of these migration parameters can be used to set policies to move the data blocks 20 between different storage devices 32A-B (also referred to as "tiers", as illustrated in FIG. 2, for example). As one non-exclusive example, a data block 20 that has a last time accessed that is greater than three weeks can be migrated from disk 32A to tape 32B. This time frame is provided as one example only, and it is recognized that any length of time can be set which determines when a data block 20 is migrated from one tier to another, such as from disk to tape. The data blocks 20 can be migrated back, e.g., from tape 32B to disk 32A, if required, to retrieve a data set. Additionally, the location of data blocks 20 can be routinely updated as necessary, and maintained in the relevant metadata index 30A-30n.

Retire Block: A Retire Block is an internal cleanup operation where a data block 20 can be deleted from the relevant block pool 14A-14n as the reference count drops to zero or some other predetermined number over a predetermined period of time, for example.

Merge Pool: As the system allows multiple block pools 14A-14n to exist, each with its own unique metadata index 30A-30n, under certain circumstances it may be necessary or advantageous to merge two or more independent block pools 14A-14n. For example, this can be required when two block pools that were initially thought to contain non-overlapping data blocks 20 but actually do contain overlapping data blocks 20. This operation can be performed in a "dry-run" mode so the user can determine the results before determining whether to actually execute the operation. Once the user is satisfied with the dry-run results, the actual merge pool operation can be executed.

FIG. 2 illustrates a host 234 (a user of the storage system 210) and one embodiment of the storage system 210 having features of the present invention. The host 234 interfaces with the storage system 210 to request data retrieval or to initiate write sequences to the storage system 210. In the embodiment illustrated in FIG. 2, the storage system 210 can include a mid-level or enterprise tiered storage appliance 236 that communicates with a third tier storage device 238, such as a backend tape library. In certain embodiments, the storage appliance 236 can include a first tier storage device 240 such as a VTL or NAS front end that includes a given physical disk storage capacity such as 2 TB, and a second tier storage device 242 such as a virtual disk with 40 TB virtual storage having 2 TB of physical disk space.

It is recognized that the effective storage capacity in these storage devices 238, 240, 242 can be varied to accommodate the design requirements of the storage system 210. It is further understood that in reference to the storage devices 238, 240, 242, the terms "first", "second" and "third" are provided for ease of discussion only, and that any of the storage devices can be the first, second or third storage device. It is also understood that alternative embodiments of the storage system 210 can include less than three storage devices or greater than three storage devices. Further, the third tier storage device 238 can be any storage device that is consistent with the teachings herein. For example, the third tier storage device 238 can be a massive array of idle disks (MAID) or any other type of archival storage device.

In this embodiment, the first tier storage device 240 includes a front end cache for fast data transfer between the host 234 and storage appliance 236. The storage appliance 236 includes a migration engine 28 (illustrated in FIG. 1) for data movement between first tier storage device 240, the second tier storage device 242 and the third tier storage device 238 under the control of unique block pool manager 12 (illustrated in FIG. 1).

The storage appliance 236 can also include a secure replication engine (not shown) for data movement between block pools 14A-14n for more efficient data transfer between a plurality of storage appliances 236 for remote branch office consolidation.

The backup data can be transferred natively to the third tier storage device 238 in case the storage appliance 236 fails, then the third tier storage device 238 can be directly attached for fast restore in enterprise applications. As used herein, the term "native" means data in its raw form such that it is not in a deduplicated form, e.g., has not been reduced by the redundancy reducer 21. The unique data block pool 14A-14n can also be transferred to the third tier storage device 238 for redundancy at very little storage premium. The overall solution means that with a very small amount of disk space, as little as 2% of size of the third tier storage device 238, in one non-exclusive example, a very large amount of storage can be virtualized to the host 234 at roughly the cost point of tape. Further, one or more high disaster recovery features (i.e. mirroring, replication, policy driven storage provisioning, etc.) can be utilized. The ratio of the effective storage capacity of the storage appliance 236 to the effective storage capacity of the third tier storage device 238 is dependent on unique data content and data storage/retention policies which can be defined and/or determined by the user as necessary.

Moreover, in certain embodiments, the data blocks 20 can be compressed prior to or following movement from one storage device to another. Compression engines known to those skilled in the art, such as gzip or bzip2 as non-exclusive examples, can be used for this purpose.

Figure 3:
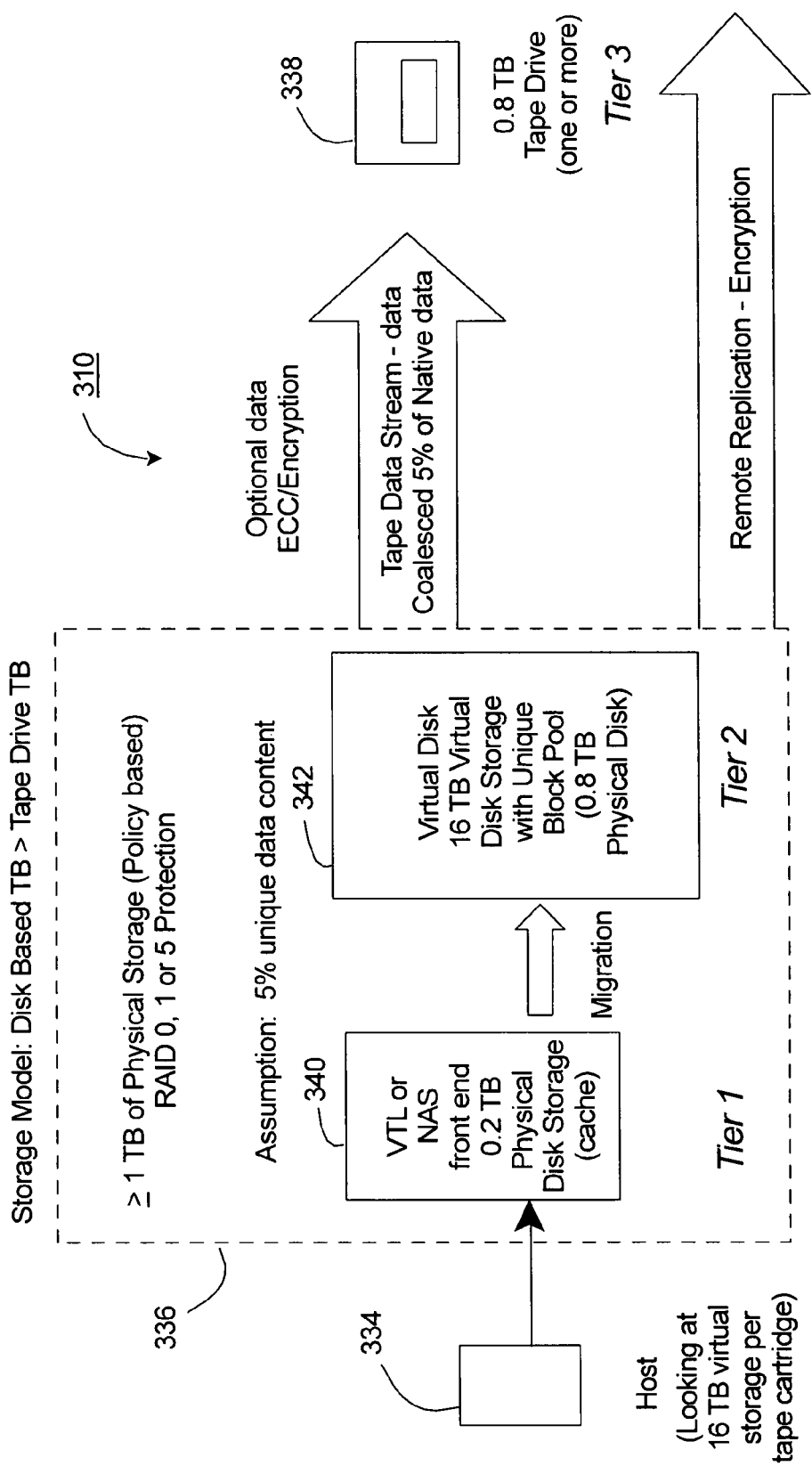
FIG. 3 is a simplified block diagram of yet another embodiment of the data storage system.

FIG. 3 illustrates a host 334 (a user of the storage system 310) and another embodiment of the storage system 310 having features of the present invention. In this embodiment, the storage system 310 can include a storage appliance 336 having a first tier storage device 340 and a second tier storage device 342 (such as an application/RAID controller server plus disks) embedded inside either tape drive or rack mount form factors. Further, the storage system 310 can include a third tier storage device 338 such as a tape drive or series of tape drives. In one embodiment, one or more of the storage devices 338, 340, 342 can be positioned inside an autoloader to export a library of unique block pools on different tape cartridges. The first tier storage device 340 can include a front end cache for fast data transfer between the host 334 and the storage appliance 336.

The storage system can also include the migration engine 28 (illustrated in FIG. 1) for data movement between the first tier storage device 340, the second storage device 342 and/or the third tier storage device 338. The storage system 310 can also include a secure replication engine (not shown) for data movement between block pools for more efficient data transfer between a plurality of storage appliances 336 for remote branch office consolidation.

In operation, the backup data can be transferred as unique block pool data to the third tier storage device 338. The overall solution means that a very large amount of storage can be virtualized relative to the size of the tape cartridge, effectively up to 20 times the density, or 20 effective cartridges on a single tape cartridge. Also, many types of backup targets and file formats can be exposed with disaster recovery features (i.e. mirroring, replication, policy driven storage provisioning, etc.). The ratio of storage on the storage appliance 336 to storage on the third tier storage device 338 is dependant on unique data content and data storage/retention policies.

Figure 4:
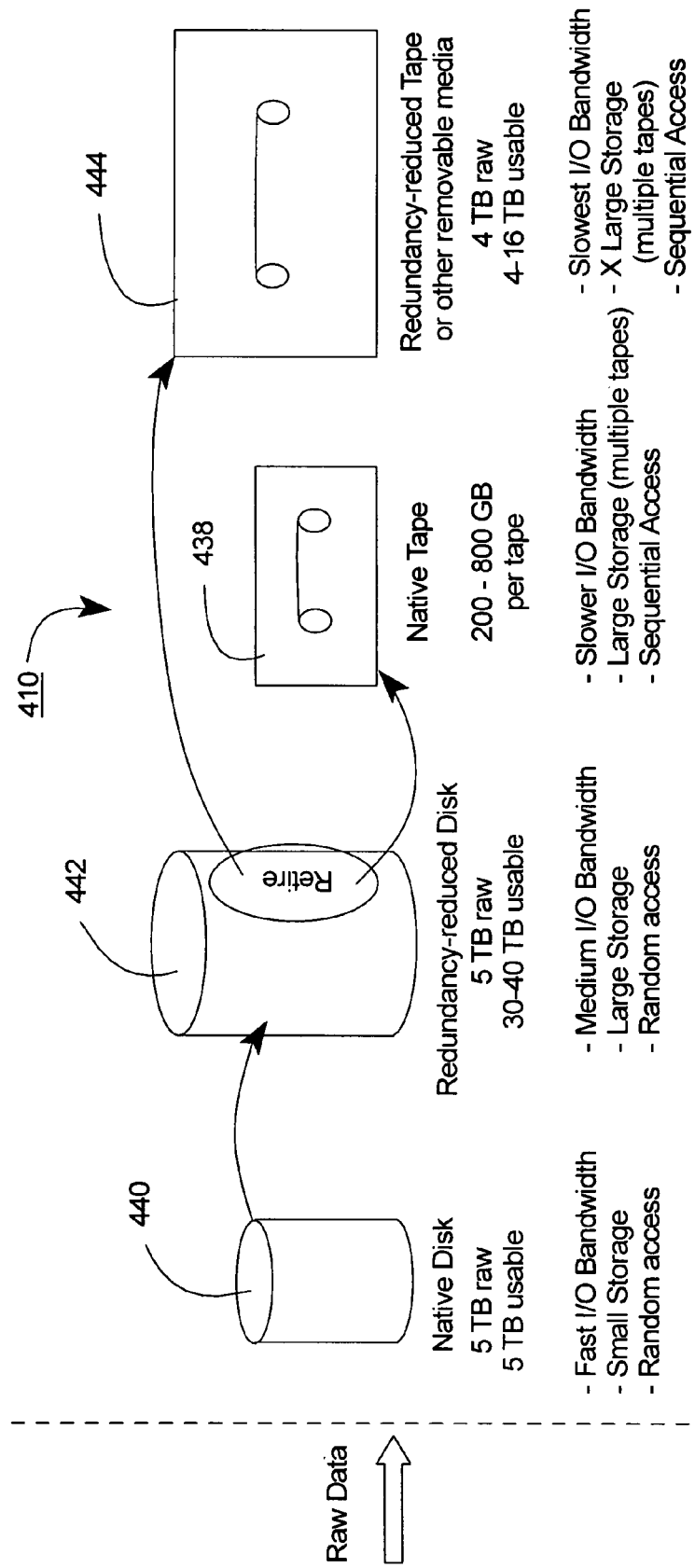
FIG. 4 is a schematic diagram illustrating one embodiment of the data storage system including a plurality of different tiers of storage devices.

FIG. 4 is a schematic diagram illustrating one embodiment of the data storage system 410 including a plurality of different tiers of storage devices. In this embodiment, FIG. 4 illustrates one example of how the different tiers of storage devices can be used depending upon the migration parameters of each of the data blocks 20 (illustrated in FIG. 1).

For example, in the embodiment illustrated in FIG. 4, the storage system 410 includes a first tier storage device 440, a second tier storage device 442, a third tier storage device 438 and a fourth tier storage device 444. The unique data blocks 20 (illustrated in FIG. 1) are moved between the storage devices 438, 440, 442, 444 by the migration engine 28 (illustrated in FIG. 1) based on the migration parameters, as described previously. The specific types of storage devices 438, 440, 442, 444 that are included in the storage system have different access parameters and are therefore tailored to accommodate data blocks with different migration parameters.

In this non-exclusive embodiment, unique data blocks can reside on native disk 440, redundancy-reduced disk 442, native tape 444 and/or redundancy-reduced tape 438. The first tier storage device 440 has a relatively high I/O bandwidth, a relatively small effective storage capacity, and uses random access. The second tier storage device 442 has less I/O bandwidth than the first tier storage device 440, larger effective storage capacity than the first tier storage device 440, and also uses random access. The third tier storage device 444 has less I/O bandwidth than the second tier storage device 442, has a relatively large effective storage capacity, particularly when multiple tapes are used, and uses sequential access. The fourth tier storage device 438 has less I/O bandwidth than the third tier storage device 444, greater effective storage capacity than the second tier storage device 442 and the third tier storage device 444, and uses sequential access. Therefore, each data block can reside on a preferred or most desired storage device in order to satisfy the goals and objectives of the user and the storage system 410. The benefits of this type of system can include one or more of increased performance, increased effective storage capacity and/or a decreased storage cost per GB. Importantly, it is recognized that the storage capacities illustrated in FIG. 4 are provided as representative examples, and are not in any way intended to limit the scope of the present invention.

It is further recognized that the storage system in accordance with the present invention need not have all four storage devices 438, 440, 442, 444, but can alternatively utilize any two or three of the storage devices 438, 440, 442, 444 illustrated, or any other suitable type of storage device consistent with the teachings herein. It is further understood that two or more of the storage devices 438, 440, 442, 444 can be combined into a single storage device. As one non-exclusive example, a single disk drive can serve the functions of the first tier storage device 440 (cache, for example) and the second tier storage device 442 (redundancy-reduced disk).

Figure 5A:
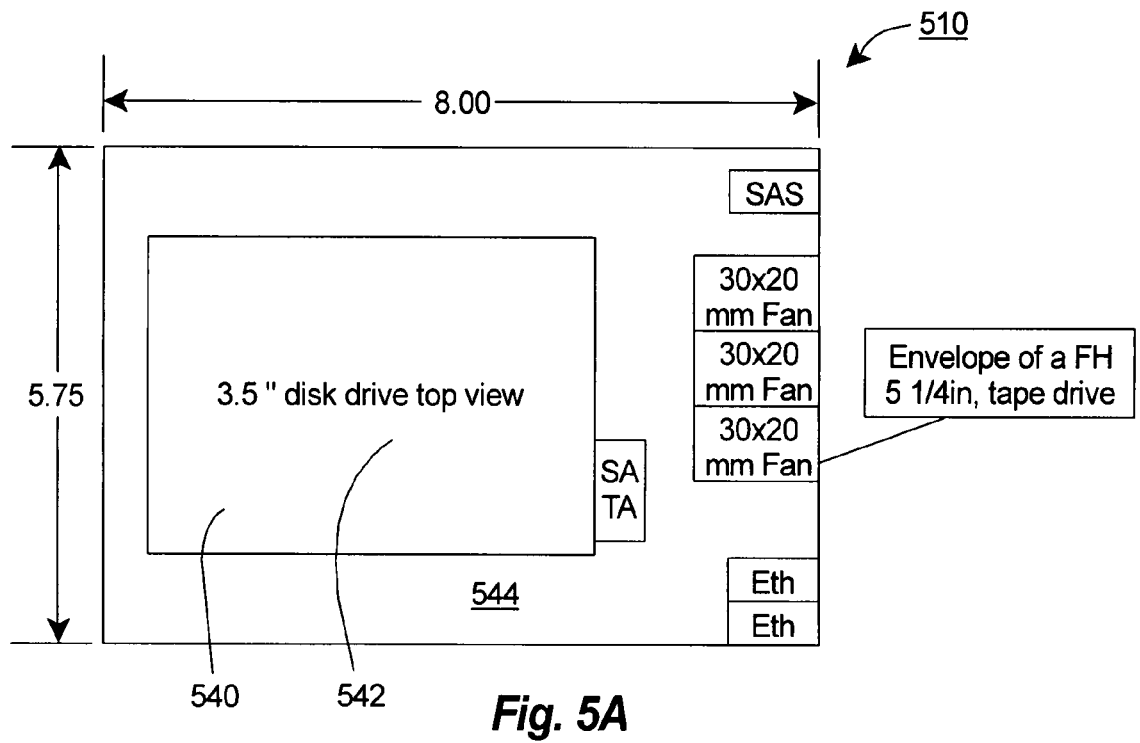
FIG. 5A is a simplified top view of one embodiment of a form factor for a portion of the data storage system.
Figure 5B:
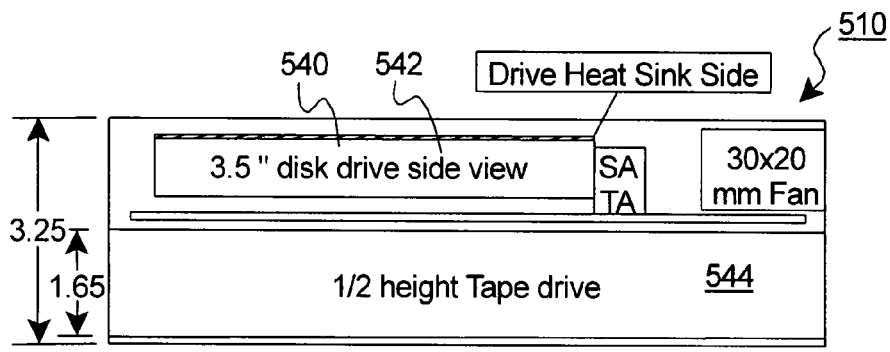
FIG. 5B is a simplified side view of the portion of the data storage system illustrated in FIG. 5A.
Figure 5C:
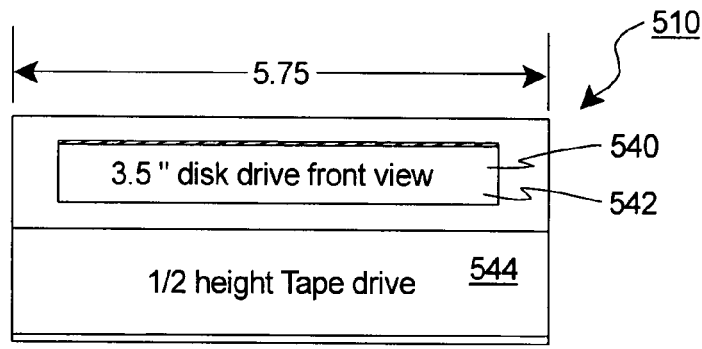
FIG. 5C is a simplified front view of the portion of the data storage system illustrated in FIG. 5A.

FIGS. 5A-5C illustrate various views of one embodiment of a form factor of a portion of the storage system 510 having an embedded 3.5-inch disk drive having a cache that serves as a first tier storage device 540 and additional storage that serves as the second tier storage device 542, as well as a third tier storage device 544 including a half-height tape drive, all in a combined disk tape appliance.

Figure 6A:
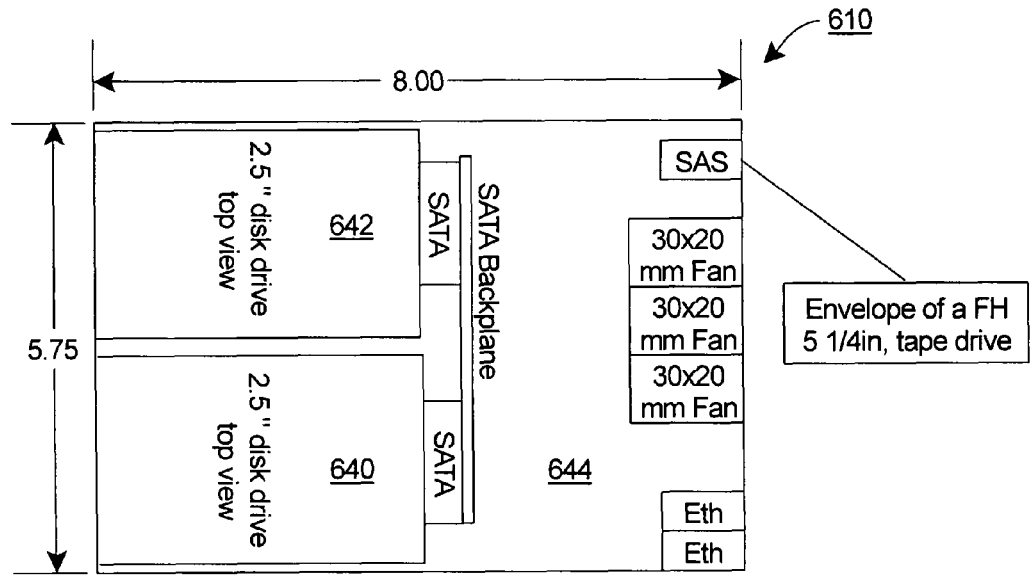
FIG. 6A is a simplified top view of another embodiment of a form factor for a portion of the data storage system.
Figure 6B:
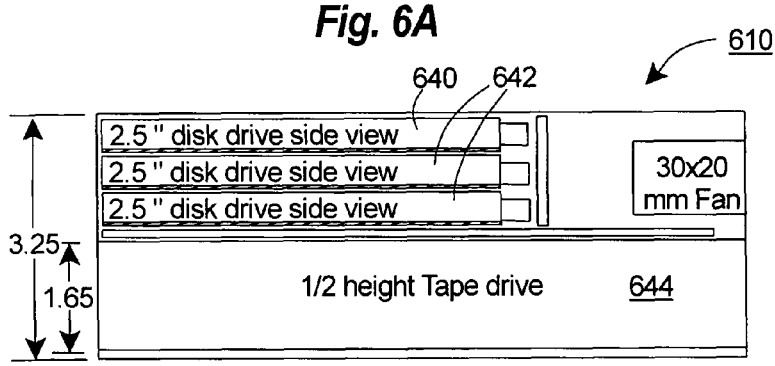
FIG. 6B is a simplified side view of the portion of the data storage system illustrated in FIG. 6A.
Figure 6C:
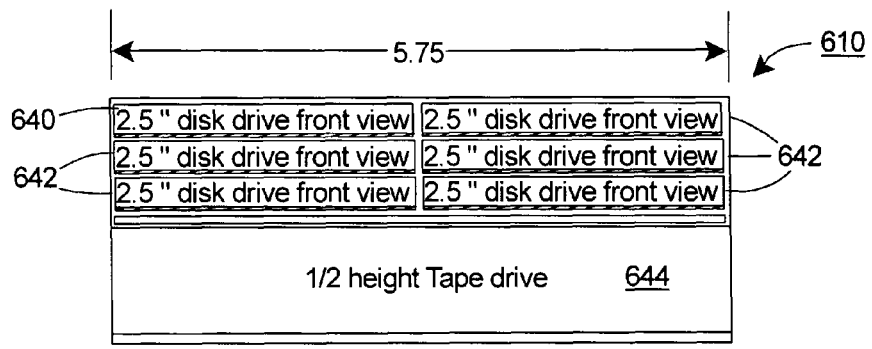
FIG. 6C is a simplified front view of the portion of the data storage system illustrated in FIG. 6A.

FIGS. 6A-6C illustrate various views of an alternative embodiment of a form factor of a portion of the storage system 610 having a first tier storage device 640 that includes one or more of six embedded 2.5-inch disk drives, a second tier storage device 642 that includes the remaining embedded 2.5-inch disk drives, and a third tier storage device 644 that includes a half-height tape drive.

Figure 7:
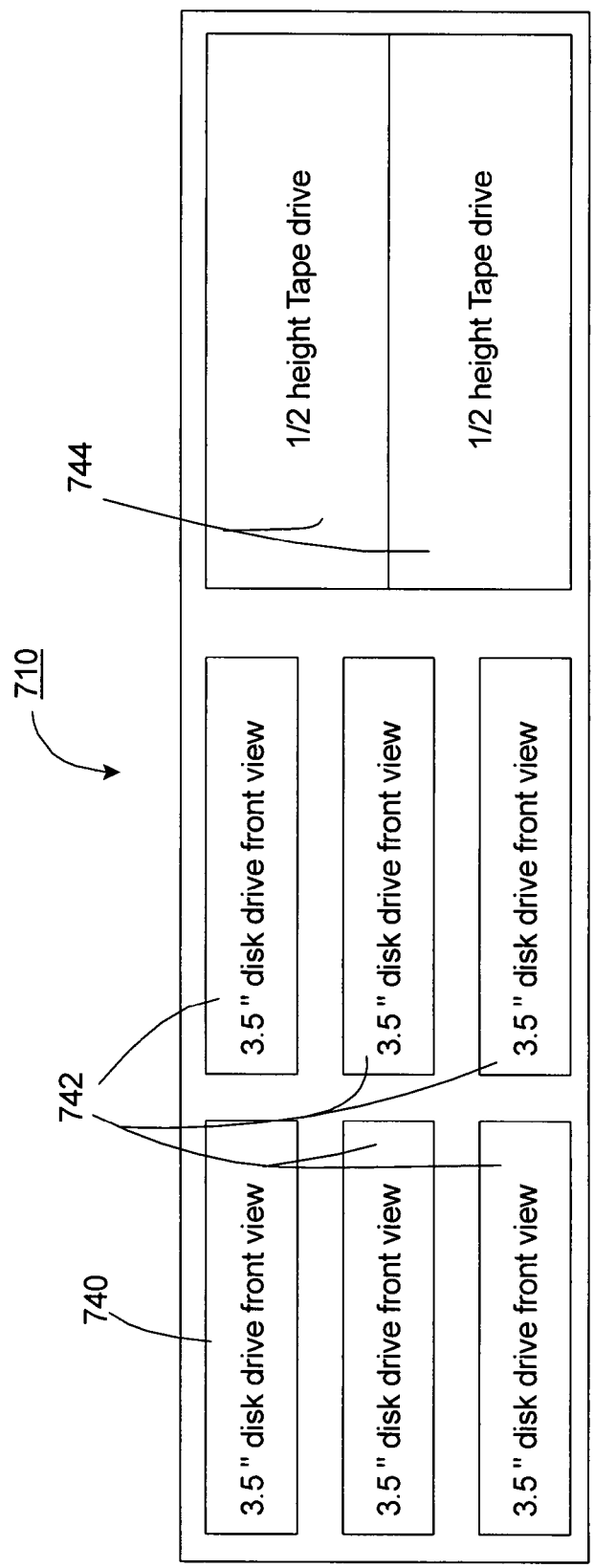
FIG. 7 is a simplified front view of another embodiment of a form factor for a portion of the data storage system.

FIG. 7 illustrates a front view of still another alternative form factor of a portion of the storage system 710 having a first tier storage device 740 that includes one or more of six embedded 3.5-inch disk drives, a second tier storage device 742 that includes the remainder of the six embedded 3.5-inch disk drives, and a third tier storage device 744 including two-half height tape drives, all in a combined disk tape appliance in a 2U rackmount unit.

While the particular storage system 10 and unique block pool manager 12 as shown and disclosed herein are fully capable of obtaining the objects and providing the advantages herein before stated, it is to be understood that they are merely illustrative of the presently preferred embodiments of the invention and that no limitations are intended to the details of the methods, construction or design herein shown and described.

What is claimed is:

1. A data storage system that receives a data set from a software module, the data storage system comprising:

a first tier storage device having a first effective storage capacity;

a second tier storage device having a second effective storage capacity that is greater than the first effective storage capacity;

a redundancy reducer that subdivides the data set into a plurality of data blocks and reduces the redundancy of the data blocks; and a migration engine that moves one of the data blocks between the first tier storage device and the second tier storage device based on a migration parameter of the data block, wherein the data set includes (i) a first data pool having a plurality of first data blocks, and (ii) a separately-stored second data pool having a plurality of second data blocks, and wherein the migration engine is adapted to merge the first data pool with the second data pool.

2. The data storage system of claim 1 wherein the redundancy reducer includes a hash engine.

3. The data storage system of claim 1 wherein the redundancy reducer includes a lookup engine.

4. The data storage system of claim 1 wherein the migration parameter includes a reference count.

5. The data storage system of claim 1 wherein the migration parameter includes a last access time.

6. The data storage system of claim 1 wherein the migration parameter includes an access rate.

7. The data storage system of claim 1 wherein the migration parameter includes a user-defined access policy.

8. The data storage system of claim 1 further comprising a metadata index that is stored one of the storage devices, wherein the migration engine updates the metadata index in conjunction with movement of one of the data blocks by the migration engine.

9. The data storage system of claim 1 wherein the first tier storage device includes a disk drive that stores at least a portion of the data set prior to reduction of the redundancy of the data blocks by the redundancy reducer.

10. The data storage system of claim 9 wherein the second tier storage device includes a disk drive that stores at least a portion of the data set following reduction of the redundancy of the data blocks by the redundancy reducer.

11. The data storage system of claim 10 further comprising a third tier storage device having a third effective storage capacity that is greater than the second effective storage capacity.

12. The data storage system of claim 11 wherein the migration engine moves one of the data blocks between the second tier storage device and the third tier storage device based at least partially on a migration parameter of the data block.

13. The data storage system of claim 11 wherein the third tier storage device includes a tape library.

14. The data storage system of claim 11 wherein the third tier storage device includes a massive array of idle disks.

15. The data storage system of claim 9 wherein the second tier storage device includes a removable media that stores at least a portion of the data set following reduction of the redundancy of the data blocks by the redundancy reducer.

16. The data storage system of claim 1 wherein the first tier storage device includes a disk drive that stores at least a portion of the data set following reduction of the redundancy of the data blocks by the redundancy reducer.

17. The data storage system of claim 16 wherein the second tier storage device includes a removable media that stores at least a portion of the data set following reduction of the redundancy of the data blocks by the redundancy reducer.

18. The data storage system of claim 1 wherein the software module is selected from the group consisting of virtual tape, network attached storage, content access storage and a cluster file system.

19. The data storage system of claim 1 wherein the first tier storage device stores data in a random access manner, and the second tier storage device stores data in a sequential access manner.

20. The data storage system of claim 1 wherein the first tier storage device stores data in a random access manner, and the second tier storage device stores data in a random access manner.

21. The data storage system of claim 1 wherein the first tier storage device has a first I/O bandwidth, and the second tier storage device has a second I/O bandwidth that is less than the first I/O bandwidth.

22. The data storage system of claim 1 wherein the first tier storage device has a first access time to data, and the second tier storage device has a second access time to data that is lengthier than the first access time to data.

23. A data storage system that receives a data set from a software module, the data storage system comprising:

a first tier storage device that stores data in a random access manner;

a second tier storage device that stores data in a sequential access manner;

a redundancy reducer, wherein the data set includes a first data pool and a separately-stored second data pool, the redundancy reducer subdividing the first data pool into a plurality of first data blocks and reducing the redundancy of the first data blocks, and the redundancy reducer subdividing the second data pool into a plurality of second data blocks and reducing the redundancy of the second data blocks; and a migration engine that moves one of the data blocks between the first tier storage device and the second tier storage device based on a migration parameter of the data block, the migration engine being adapted to merge the first data pool with the second data pool.

24. The data storage system of claim 23 wherein the redundancy reducer includes a hash engine and a lookup engine.

25. The data storage system of claim 23 wherein the migration parameter includes at least one of a reference count, a last access time, an access rate and a user-defined access policy.

26. The data storage system of claim 23 further comprising a metadata index that is stored one of the storage devices, wherein the migration engine updates the metadata index in conjunction with movement of one of the data blocks by the migration engine.

27. The data storage system of claim 23 wherein the first tier storage device includes a disk drive that stores at least a portion of the data set following reduction of the redundancy of the data blocks by the redundancy reducer, and the second tier storage device includes a removable media that stores at least a portion of the data set following reduction of the redundancy of the data blocks by the redundancy reducer.

28. The data storage system of claim 23 wherein the second tier storage device includes one of a tape library and a massive array of idle disks.

29. The data storage system of claim 23 wherein the software module is selected from the group consisting of virtual tape, network attached storage, content access storage and a cluster file system.

30. The data storage system of claim 23 wherein the first tier storage device has a first I/O bandwidth, and the second tier storage device has a second I/O bandwidth that is less than the first I/O bandwidth.

31. The data storage system of claim 23 wherein the first tier storage device has a first access time to data, and the second tier storage device has a second access time to data that is lengthier than the first access time to data.

32. A data storage system that receives a data set from a software module, the data storage system comprising:
- a first tier storage device having a first I/O bandwidth;
- a second tier storage device having a second I/O bandwidth that is less than the first I/O bandwidth;
- a redundancy reducer, wherein the data set includes a first data pool and a separately-stored second data pool, the redundancy reducer subdividing the first data pool into a plurality of first data blocks and reducing the redundancy of the first data blocks; and
- a migration engine that moves one of the first data blocks between the first tier storage device and the second tier storage device based on a migration parameter of the first data block, the migration engine being adapted to merge the first data pool with the second data pool.

33. The data storage system of claim 32 wherein the redundancy reducer includes at least one of a hash engine and a lookup engine.

34. The data storage system of claim 32 wherein the migration parameter includes at least one of a reference count, a last access time, an access rate and a user-defined access policy.

35. The data storage system of claim 32 further comprising a metadata index that is stored one of the storage devices, wherein the migration engine updates the metadata index in conjunction with movement of one of the first data blocks by the migration engine.

36. The data storage system of claim 32 wherein the first tier storage device includes a disk drive that stores at least a portion of the data set prior to reduction of the redundancy of the first data blocks by the redundancy reducer, and the second tier storage device includes a disk drive that stores at least a portion of the data set following reduction of the redundancy of the first data blocks by the redundancy reducer.

37. The data storage system of claim 36 further comprising a third tier storage device having a third I/O bandwidth that is less than the second I/O bandwidth.

38. The data storage system of claim 37 wherein the migration engine moves one of the first data blocks between the second tier storage device and the third tier storage device based at least partially on a migration parameter of the first data block.

39. The data storage system of claim 38 wherein the third tier storage device includes one of a tape library and a massive array of idle disks.

40. The data storage system of claim 32 wherein the first tier storage device includes a disk drive that stores at least a portion of the data set following reduction of the redundancy of the first data blocks by the redundancy reducer, and the second tier storage device includes a removable media that stores at least a portion of the data set following reduction of the redundancy of the first data blocks by the redundancy reducer.

41. The data storage system of claim 32 wherein the software module is selected from the group consisting of virtual tape, network attached storage, content access storage and a cluster file system.

42. The data storage system of claim 32 wherein the first tier storage device has a first access time to data, and the second tier storage device has a second access time to data that is lengthier than the first access time to data.

43. A data storage system that receives a data set from a software module, the data storage system comprising:
- a first tier storage device having a first access time to data;
- a second tier storage device having a second access time to data that is lengthier than the first access time to data;
- a redundancy reducer, wherein the data set includes a first data pool and a separately-stored second data pool, the redundancy reducer subdividing the first data pool into a plurality of first data blocks and reducing the redundancy of the first data blocks; and
- a migration engine that moves one of the first data blocks between the first tier storage device and the second tier storage device based on a migration parameter of the first data block, the migration engine being adapted to merge the first data pool with the second data pool.

44. The data storage system of claim 43 wherein the redundancy reducer includes at least one of a hash engine and a lookup engine.

45. The data storage system of claim 43 wherein the migration parameter includes at least one of a reference count, a last access time, an access rate and a user-defined access policy.

46. The data storage system of claim 43 further comprising a metadata index that is stored one of the storage devices, wherein the migration engine updates the metadata index in conjunction with movement of one of the first data blocks between the storage devices by the migration engine.

47. The data storage system of claim 43 wherein the first tier storage device includes a disk drive that stores at least a portion of the data set prior to reduction of the redundancy of the first data blocks by the redundancy reducer, and the second tier storage device includes a disk drive that stores at least a portion of the data set following reduction of the redundancy of the first data blocks by the redundancy reducer.

48. The data storage system of claim 47 further comprising a third tier storage device having a third access time to data that is lengthier than the second access time to data.

49. The data storage system of claim 48 wherein the migration engine moves one of the first data blocks between the second tier storage device and the third tier storage device based at least partially on a migration parameter of the first data block.

50. The data storage system of claim 49 wherein the third tier storage device includes one of a tape library and a massive array of idle disks.

51. The data storage system of claim 43 wherein the first tier storage device includes a disk drive that stores at least a portion of the data set following reduction of the redundancy of the first data blocks by the redundancy reducer, and the second tier storage device includes a removable media that stores at least a portion of the data set following reduction of the redundancy of the first data blocks by the redundancy reducer.

52. The data storage system of claim 43 wherein the software module is selected from the group consisting of virtual tape, network attached storage, content access storage and a cluster file system.

53. A data storage system that receives a data set from a software module, the data storage system comprising:
- a first tier storage device having a first effective storage capacity;
- a second tier storage device having a second effective storage capacity that is greater than the first effective storage capacity; and
- a migration engine, wherein the data set includes (i) a first data pool having a plurality of first data blocks, and (ii) a separately-stored second data pool having a plurality of second data blocks, the migration engine moving one of the data blocks between the first tier storage device and the second tier storage device based on a migration parameter of the data block, and the migration engine being adapted to merge the first data pool with the second data pool.

54. The data storage system of claim 53 wherein the migration parameter includes at least one of a reference count, a last access time, an access rate and a user-defined access policy.

55. The data storage system of claim 53 further comprising a redundancy reducer that reduces the redundancy of the data blocks.

* * * * *